(12) United States Patent
Müller

(10) Patent No.: US 11,125,138 B2
(45) Date of Patent: Sep. 21, 2021

(54) PIPE, ESPECIALLY EXHAUST GAS-GUIDING PIPE

(71) Applicant: Purem GmbH, Neunkirchen (DE)

(72) Inventor: Joachim Müller, Metzingen (DE)

(73) Assignee: Purem GmbH, Neunkirchen (DE)

( * ) Notice: Subject to any disclaimer, the term of this patent is extended or adjusted under 35 U.S.C. 154(b) by 546 days.

(21) Appl. No.: 15/975,991

(22) Filed: May 10, 2018

(65) Prior Publication Data

US 2018/0328256 A1    Nov. 15, 2018

(30) Foreign Application Priority Data

May 11, 2017  (DE) ..................... 10 2017 110 217.5

(51) Int. Cl.
*F01N 13/18*         (2010.01)
*F16L 21/06*         (2006.01)

(52) U.S. Cl.
CPC .......... *F01N 13/1805* (2013.01); *F16L 21/06* (2013.01); *F16L 21/065* (2013.01)

(58) Field of Classification Search
CPC ...... F10N 13/1805; F16L 21/06; F16L 21/065
USPC ........................................................ 285/420
See application file for complete search history.

(56) References Cited

U.S. PATENT DOCUMENTS

| 1,661,674 | A | | 3/1928 | Milton |
| 4,113,289 | A | | 9/1978 | Wagner et al. |
| 4,629,226 | A | | 12/1986 | Cassel et al. |
| 5,588,680 | A | | 12/1996 | Cassel et al. |
| 5,944,365 | A | * | 8/1999 | Kizler ..................... F16L 21/06 285/420 |
| 6,089,624 | A | * | 7/2000 | Cassel ................. F01N 13/1805 285/420 |
| 7,775,561 | B2 | * | 8/2010 | Swank .................. F16L 21/065 |
| 9,309,798 | B2 | * | 4/2016 | Smith | |
| 2006/0071471 | A1 | | 4/2006 | Ignaczak et al. |
| 2018/0087698 | A1 | * | 3/2018 | Lenn ..................... F16L 21/065 |

FOREIGN PATENT DOCUMENTS

| CN | 101048612 A | 10/2007 |
| CN | 202 612 913 U | 12/2012 |
| CN | 203856558 U | 10/2014 |
| CN | 204175408 U | 2/2015 |
| DE | 695 21 314 T2 | 11/2001 |
| DE | 10 2006 057 881 C5 | 7/2010 |
| DE | 10 2015 201489 A1 | 9/2015 |
| EP | 2679426 A1 | 1/2014 |
| JP | 2599144 B2 | 4/1997 |

* cited by examiner

*Primary Examiner* — Zachary T Dragicevich
(74) *Attorney, Agent, or Firm* — McGlew and Tuttle, P.C.

(57) ABSTRACT

A pipe, especially an internal combustion engine, exhaust system, exhaust gas-guiding pipe, includes a connection area (26). The connection area (26) is at an axial pipe end (12) for connecting the pipe (14) extending in a pipe longitudinal axis (A) to another pipe (16) to be pushed into the connection area (26). The connection area (26) includes two slots (18*a*, 18*b*). The slots (18*a*, 18*b*) include a first slot area (20*a*, 20*b*), located closer to the pipe end (12), and a second slot area (22*a*, 22*b*), located axially farther away from the pipe end (12) and offset in a circumferential direction in relation to the first slot area (20*a*, 20*b*). The second slot areas (22*a*, 22*b*) of the two slots (18*a*, 18*b*) are offset toward one another or away from one another in the circumferential direction in relation to the first slot areas (20*a*, 20*b*).

17 Claims, 3 Drawing Sheets

PIPE, ESPECIALLY EXHAUST GAS-GUIDING PIPE

CROSS REFERENCE TO RELATED APPLICATIONS

This application claims the benefit of priority under 35 U.S.C. § 119 of German Application 10 2017 110 217.5, filed May 11, 2017, the entire contents of which are incorporated herein by reference.

FIELD OF THE INVENTION

The present invention pertains to a pipe, especially to an exhaust gas-guiding pipe for an exhaust system of an internal combustion engine, wherein a connection area is provided at an axial pipe end for connecting the pipe extending in the direction of a pipe longitudinal axis to another pipe to be pushed into the connection area. The connection area comprises at least one slot, wherein the slot has a first slot area located closer to the pipe end and a second slot area that is located axially farther away from the pipe end and is offset in relation to the first slot area.

BACKGROUND OF THE INVENTION

Such a pipe is known from U.S. Pat. No. 5,588,680, which relates to a pipe assembly of two pipes manufactured therewith. The pipe assembly has a slot with two slot areas, offset in relation to one another in a circumferential direction at an axial pipe end of a first of the two pipes. To ensure that the two pipes pushed one into another are held firmly together, a pipe clamp surrounds the connection area of the first pipe such that the slot is covered by the pipe clamp. The clamp clamps the connection area together in the circumferential direction and thus presses same radially against the second pipe, essentially over the entire area over which the clamp extends axially.

SUMMARY OF THE INVENTION

An object of the present invention is to provide a pipe, especially an exhaust gas-guiding pipe for an exhaust system of an internal combustion engine, with which improved tightness of two pipes that are to be connected to one another can be achieved.

This object is accomplished according to the present invention by a pipe, especially an exhaust gas-guiding pipe for an exhaust system of an internal combustion engine, wherein a connection area is provided at at least one axial pipe end for connecting the pipe extending in the direction of a longitudinal axis of the pipe to another pipe to be pushed into the connection area. This pipe is characterized in that the connection area comprises two slots. The slots each have a first slot area, located closer to the pipe end, and a second slot area, which is located axially farther away from the pipe end and is offset in relation to the first slot area in the circumferential direction. The slot areas of the two slots are offset towards one another or away from one another in relation to the first slot areas in the circumferential direction. Improved deformability of the pipe in its connection area is guaranteed by the configuration according to the present invention of a connection area of a pipe with a plurality of, especially two slots. Further, an improved sealing effect is guaranteed by such a configuration of the slots in which the first slot areas have a greater mutual distance than the second slot areas when the second slot areas are offset towards one another and they have a smaller mutual distance than the second slot areas when the second slot areas are offset away from one another, in conjunction with the better deformability of the pipe and with the reduction of the respective slot width, which occurs during the bracing in the circumferential direction.

To make it possible to utilize the deformability of the pipe in the connection area thereof especially efficiently, it is proposed that the first slot areas and the second slot areas be defined each in the circumferential direction by an inner slot edge facing the respective other slot and by an outer slot edge facing away from the respective other slot and that an angular distance of the inner slot edges of the first slot areas be smaller than 180°, preferably in the range of 110° to 130° and preferably about 120° in the area thereof adjoining the pipe end.

Provisions may be made in an advantageous variant of the pipe configured according to the present invention for the outer slot edge or/and the inner slot edge to extend from at least one slot and preferably from both slots in at least one slot area and preferably in the first slot area and in the second slot area essentially in the longitudinal axis of the pipe or/and for the outer slot edge and the inner slot edge to extend essentially parallel to one another.

To guarantee, on the one hand, a sufficient deformability of the pipe in its connection area but, on the other hand, to also make possible the interaction of the respective slot edges, which is necessary for establishing a sealing effect, the outer slot edge and the inner slot edge may have a circumferential distance in the range of 3 mm to 5 mm and preferably about 4 mm from at least one slot, preferably from both slots, in at least one slot area, preferably in the first slot area and in the second slot area.

The first slot areas of the two slots may have essentially the same length of extension in the direction of the pipe longitudinal axis. Further, the second slot areas of the two slots may have essentially the same length of extension in the direction of the pipe longitudinal axis.

It is proposed for a configuration that is especially advantageous concerning the attainable sealing effect that the two slots be configured essentially mirror-symmetrically in relation to a symmetry axis that is essentially parallel in relation to the pipe longitudinal axis.

To introduce the offset of the slot areas of a respective slot, the inner slot edges of the first and second slot areas of the two slots may be connected to one another by inner transition edges and the outer slot edges of the first and second slot areas of the two slots may be connected to one another by outer transition edges. To achieve the mutual contact of the inner and outer transition edges, which contact supports the sealing effect, the inner transition edge or/and the outer transition edge of at least one slot and preferably of both slots is bent at an angle in relation to the reference line extending in the circumferential direction.

The configuration may, for example, be such that the inner transition edge and the outer transition edge in at least one slot and preferably in both slots are bent at an angle in relation to one another in the same direction in relation to the reference line and one of the transition edges, preferably the inner transition edge, is bent at an angle to a greater extent in relation to the reference line than the other of the transition edges, preferably the outer transition edge, wherein an end of the transition edge bent at an angle to a lesser extent, preferably of the outer transition edge, which end is located closer to the transition edge bent at an angle to a greater extent, preferably to the inner transition edge, is located axially between the two ends of the transition edge bent at an angle to a greater extent, preferably of the inner transition edge.

In an alternative embodiment, the inner transition edge and the outer transition edge may be bent at an angle in relation to one another in opposite directions in relation to the reference line in at least one slot and preferably in both slots, such that one of the transition edges, preferably the outer transition edge with the slot edge of the first slot area, which said slot edge adjoins it, forms an undercut, wherein an end of the one transition edge, preferably of the outer transition edge, which end is located closer to the other transition edge, preferably to the inner transition edge, is located axially between the two ends of the other transition edge, preferably of the inner transition edge.

To make it possible to guarantee the essentially symmetrical configuration of the two slots, it is proposed that the outer transition edges of the two slots be bent at an angle in relation to one another in opposite directions or/and to an equal extent in relation to the reference line, or/and that the inner transition edges of the two slots be bent at an angle in relation to one another in opposite directions or to an equal extent in relation to the reference line.

The present invention further pertains to a pipe assembly, comprising a first pipe configured according to the principles of the present invention and a second pipe pushed into a connection area of the first pipe, further comprising a pipe clamp surrounding the first pipe in the connection area and pressing the first pipe radially against the second pipe.

To use the pipe clamp efficiently to achieve a gas-tight connection of the two pipes, it is proposed that the pipe clamp cover the slots provided in the connection area essentially fully in the axial direction, preferably such that a bottom of the slots, which is located away from the pipe end, is covered by the pipe clamp or/and a slot area located between the respective slot bottom and the transition edges of a respective slot is completely covered by the pipe clamp.

Further, taking into consideration the essentially symmetrical configuration of the two slots, the sealing effect to be generated in conjunction with the pipe clamp can be optimized by a clamp lock area of the pipe clamp in the connection area of the first pipe being arranged essentially centrally between the two slots in a circumferential area with a smaller angular extension between the two slots, preferably in the circumferential direction.

The present invention will be described in detail below with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
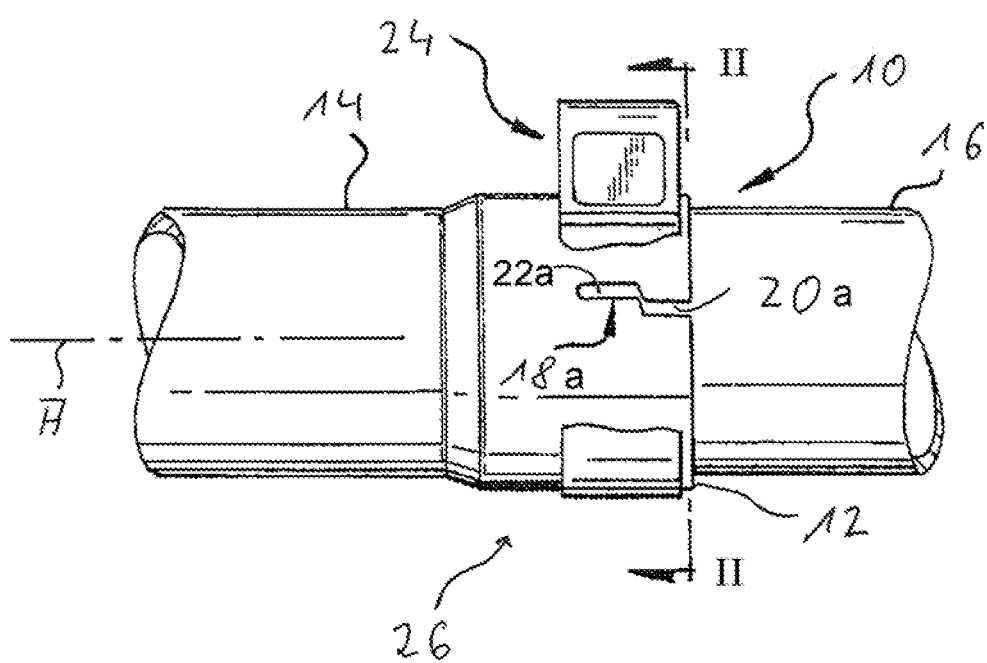
FIG. 1 is a side view showing a pipe assembly according to the invention comprising two pipes pushed into one another.

Referring to the drawings, a configuration according to the present invention of a pipe or of a pipe assembly to be manufactured therewith will be described below with reference to FIGS. 1 through 4. This pipe assembly comprises slots 18a and 18b (only slot 18a is visible in FIG. 1), each with two slot areas 20a, 22a and 20b and 22b respectively. The first slot 18a and the second slot 18b are offset in relation to one another in the circumferential direction as shown in FIG. 2. This configuration of first slot 18a and second slot 18b is provided in a pipe assembly 10 at an axial pipe end 12 of a first pipe 14 of the two pipes 14 and 16. To ensure that the two pipes 14, 16 pushed one into another are held firmly together, a pipe clamp 24 surrounds the connection area 26 of the first pipe 14 such that the first slot 18a and the second slot 18b are covered by the pipe clamp 24, which clamps the connection area 26 together in the circumferential direction and thus presses same radially against the second pipe 16, essentially over the entire area over which it extends axially.

The configuration of the first pipe 14 according to the present invention and a pipe assembly 16 built therewith, utilizes the two slots 18a, 18b, that are arranged at circumferentially spaced locations from one another and are provided in the connection area 26 of the pipe 14. Into this connection area 26 the other pipe 16 is to be pushed. Each of the two slots 18a, 18b has two slot areas 20a, 22a and 20b, 22b, respectively, which are preferably open towards one another. The first two slot areas 20a, 20b of the two slots 18a, 18b are open in the direction of a pipe longitudinal axis A. The two second slot areas 22a, 22b, connected to the first slot areas 20a, 20b, each provide a slot bottom 28a, 28b, i.e., the respective axial end of the respective slot 18a and 18b.

Each of the first slot areas 20a, 20b of the two slots 18a, 18b is limited in the direction away from the respective other slot by an outer slot edge 30a, 30b and in the direction towards the respective other slot by an inner slot edge 32a, 32b in the circumferential direction. The outer and inner slot edges 30a, 30b and 32a, 32b preferably extend parallel to one another and essentially also parallel to the pipe longitudinal axis A in each of the two slots 18a, 18b, so that each first slot area 20a, 20b has an essentially constant circumferential width B1 of, for example, about 4 mm.

Each of the second slot areas 22a, 22b of the two slots 18a, 18b is limited on a circumferential side facing away from the respective other slot by an outer slot edge 34a, 34b and on a circumferential side facing the respective other slot by an inner slot edge 36a, 36b. The outer and inner slot edges 34a, 34b and 36a, 36b of the two second slot areas 22a, 22b also extend each preferably essentially parallel to one another and also to the pipe longitudinal axis A, so that the second slot areas 22a, 22b have an essentially constant slot width B2 of, for example, about 4 mm. Thus, the respective first slot area 20a, 20b and the respective second slot area 22a, 22b thus preferably have the same circumferential width in each of the two slots 18a, 18b.

Figure 3:
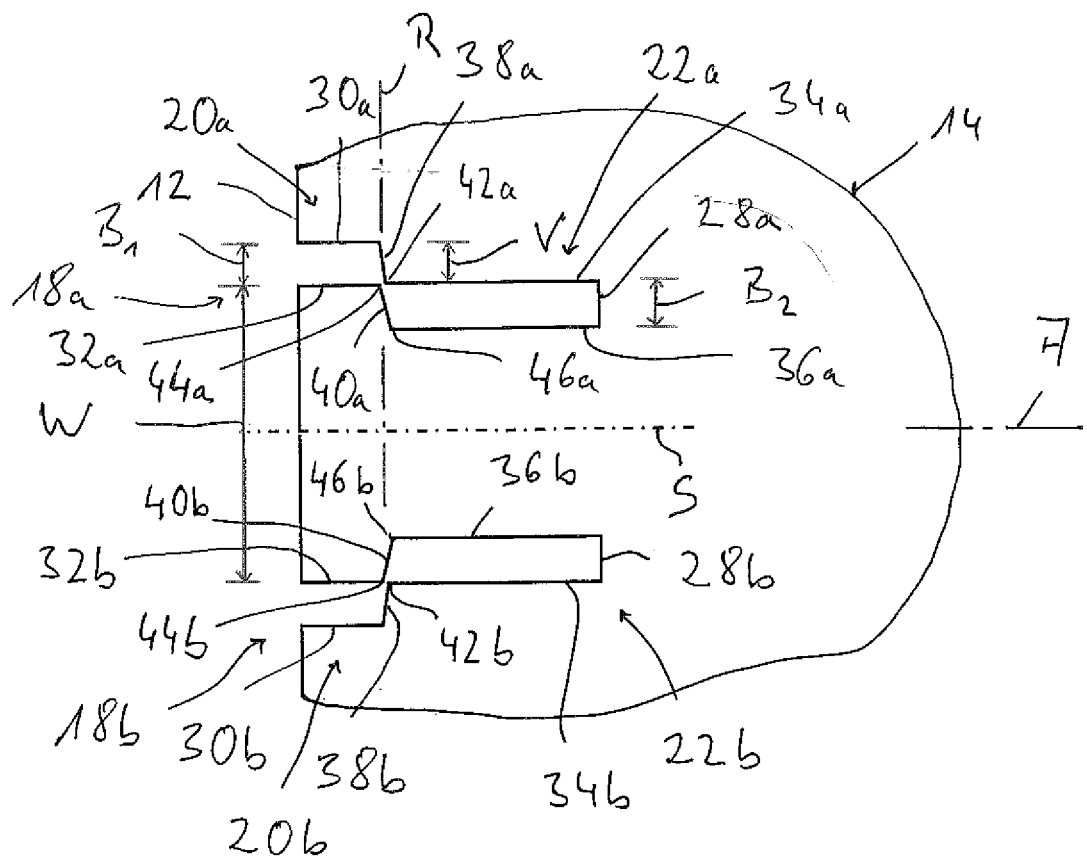
FIG. 3 is a circumferential layout of a section of a connection area of a pipe of the pipe assembly shown in FIG. 2.

FIG. 3 shows clearly that in each of the two slots 18a, 18b, the second slot area 22a, 22b is offset in the circumferential direction in relation to the first slot area 20a, 20b. The two second slot areas 22a, 22b are offset in opposite directions, especially towards one another, in relation to the respective associated first slot area 20a, 20b. The second slot areas 22a, 22*b* thus have a smaller mutual distance than the two first slot areas 20*a*, 20*b*, for example, in relation to their respective outer slot edges 34*a*, 34*b* or inner slot edges 36*a*, 36*b*. In particular, an offset V present in each of the two slots 18*a*, 18*b* between the respective first slot area 20*a*, 20*b* and the second slot area 22*a*, 22*b* can thus correspond essentially to the circumferential width B1 or B2 of a respective slot 18*a*, 18*b* in the two slot areas 20*a*, 20*b* and 22*a*, 22*b* thereof. This causes the inner circumferential edge 32*a* of the first slot area 20*a* to continue essentially axially the outer circumferential edge 34*a* of the second slot area 22*a* in the direction of the pipe longitudinal axis A or to have essentially no circumferential offset in relation thereto, for example, in the case of the slot 18*a*.

Corresponding statements also apply to the inner circumferential edge 32*b* of the first slot area 20*b* of the slot 18*b* and the outer circumferential edge 34*b* of the second slot area 22*b* of this slot 18*b*.

The angular distance of the respective inner circumferential edges 32*a*, 32*b* of the two first slot areas 20*a* may be about 120° in the embodiment of the connection area 26 shown in FIGS. 2 and 3. The corresponding angular distance of the inner slot edges 36*a*, 36*b* of the two slot areas 22*a*, 22*b* is correspondingly smaller now. The configuration is preferably, in this case, such that the two slots 18*a*, 18*b* are configured essentially mirror-symmetrically in relation to one another in relation to a symmetry axis S parallel to the pipe longitudinal axis A.

The offset V of the two slot areas 20*a*, 22*a* and 20*b*, 22*b*, which is present in each of the slots 18*a*, 18*b*, is introduced essentially by the fact that the respective outer slot edges 30*a*, 34*a* of the slot 18*a* are connected to one another by an outer transition edge 38*a*, while the inner slot edges 32*a*, 36*a* of this slot 18*a* are connected to one another by an inner transition edge 40*a*. The outer slot edges 30*b*, 34*b* of the slot 18*b* are connected to one another in a corresponding manner by an outer transition edge 38*b*, while the inner slot edges 32*b*, 36*b* of the slot 18*b* are connected to one another by an inner transition edge 40*b*. The respective inner and outer transition edges 38*a*, 40*a* and 38*b*, 40*b* are bent at an angle in relation to a reference line R extending essentially in the circumferential direction in each of the two slots 18*a*, 18*b*, i.e., they do not extend parallel and they do not extend at right angles thereto. The transition edges 38*a*, 40*a* of the slot 18*a* and the transition edges 38*b*, 40*b* of the slot 18*b* are bent at an angle in relation to one another in opposite directions in relation to the reference line R, while in each of the slots 18*a*, 18*b*, the transition edges 38*a*, 40*a* and 38*b*, 40*b* present each in these are bent at an angle in relation to one another in the same direction but to different extents in relation to the reference line R. In particular, the respective inner transition edges 40*a*, 40*b* are bent at an angle to a greater extent in relation to the reference line R than the respective outer transition edges 38*a*, 38*b*. A configuration is thus obtained in which an end 42*a* of the outer transition edge 38*a* of the slot 18*a*, which end is located closer to the inner transition edge 40*a*, is located axially between the two ends 44*a*, 46*a* of the inner transition edge 40*a*. A corresponding configuration is also present in the case of the end 42*b* of the outer transition edge 38*b* of the slot 18*b*, which end is located closer to the inner transition edge 40*b*, in relation to the ends 44*b*, 46*b* of the inner transition edge 40*b*.

To manufacture the pipe assembly 10, the pipe 16 is pushed into the connection area 26 of the pipe 14 to an extent that is greater than the axial extension length of the two slots 18*a*, 18*b*, so that the pipe 16 with its area pushed into the connection area 26 fully covers the two slots 18*a*, 18*b* in the direction of the pipe longitudinal axis A. The pipe clamp 24 is then placed or the pipe clamp 24 that may already have been applied is positioned such that a clamp lock 48 thereof, in which circumferential end areas of a strap-like clamp body 50, which surrounds the connection area 26, are braced against one another by means of, for example, a bolt 52, is positioned such that the clamp lock 48 is positioned between the two slots 18*a*, 18*b*, namely, in the circumferential area 54 of the pipe 14 with a smaller angular extension. When the clamp lock 48 is tightened and the shell body 50 is consequently braced over the outer circumference of the connection area 26, this connection area is clamped together in the circumferential direction and is thus radially compressed. The circumferential width of the two slots 18*a*, 18*b* also decreases now, because the respective outer slot edges 30*a*, 34*a* and 30*b*, 34*b* move in the circumferential direction towards the respective inner slot edges 32*a*, 36*a*, 32*b*, 36*b*. The ends 42*a*, 42*b* of the respective outer transition edges 38*a*, 38*b* come closer to the respective inner transition edges 40*a*, 40*b* during the reduction of the slot width and come into contact there or cut into these. A closure of the slots 18*a*, 18*b* of the previously open slot areas 20*a*, 22*a* and 20*b*, 22*b*, which closure acts in the longitudinal axis of the slot, is thus generated in the area in which an offset is present between the respective slot areas 20*a*, 22*b* and 20*b*, 22*b*.

Figure 2:
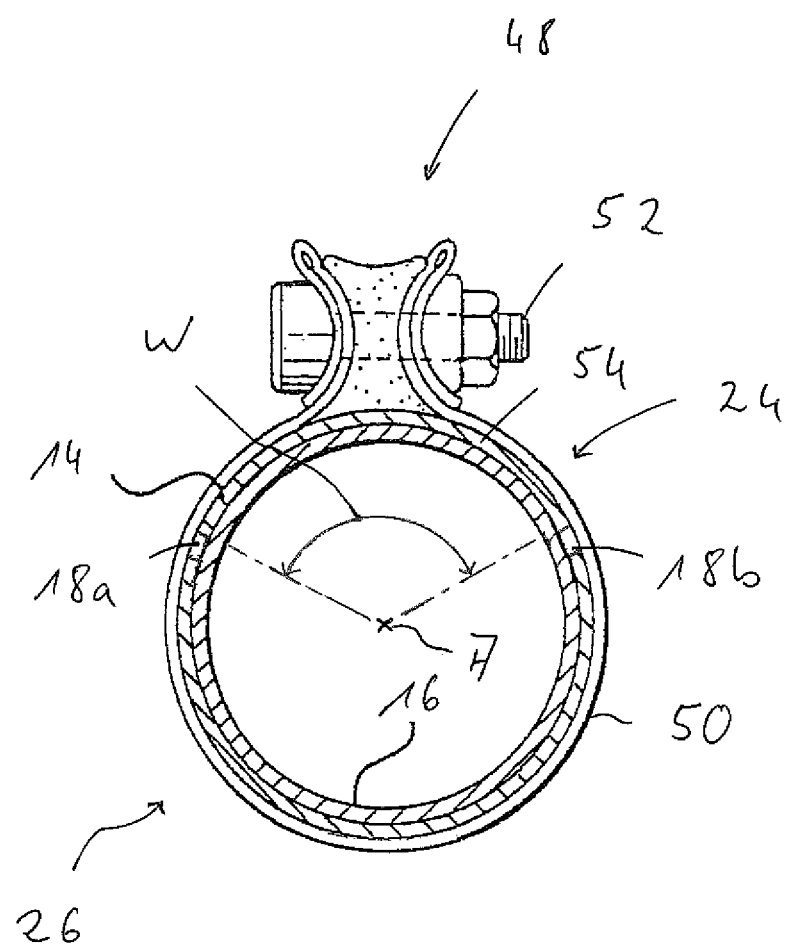
FIG. 2 is a pipe assembly according to FIG. 1, cut along a line II-II in FIG. 1.

As can be seen on the basis of FIG. 1, the clamp body 50 of the pipe clamp 48 is further dimensioned such that it covers the slots 18*a*, 18*b* essentially fully, especially the respective second slot area 22*a*, 22*b* between the slot bottom 28*a*, 28*b* and the transition edges 38*a*, 40*a* and 38*b*, 40*b*, which are mutually in contact with one another or cut into one another, in the direction of the pipe longitudinal axis R. The slots 18*a*, 18*b* are thus closed, especially in their respective second slot areas 22*a*, 22*b*, not only in the direction of the pipe longitudinal axis A, but also radially outwardly, so that escape of the medium being carried in the pipes 14, 16, for example, of the exhaust gas discharged from an internal combustion engine of a vehicle, is ruled out.

The establishment of this gas-tight closure is supported based on the essentially mirror-symmetric configuration of the two slots 18*a*, 18*b*, because it is ensured that the respective end 42*a*, 42*b* of the outer transition edge 38*a*, 38*b* in each of the two slots 18*a*, 18*b* approaches the associated inner transition edge 40*a*, 40*b* in the circumferential direction and cuts into same during the circumferential bracing generated by the clamp body 50. This is generated especially by the circumferential areas of the clamp body 50, which adjoin the clamp lock 48 and also cover the slots 18*a*, 18*b*, being moved during the tightening of the clamp lock 48 in relation to one another in opposite directions and towards one another in the circumferential direction and thus generating the motion of the outer slot edges 30*a*, 34*a* of the slot 18*a*, which takes place correspondingly in opposite directions, in relation to the outer slot edges 30*b*, 34*b* of the slot 18*b*.

Figure 4:
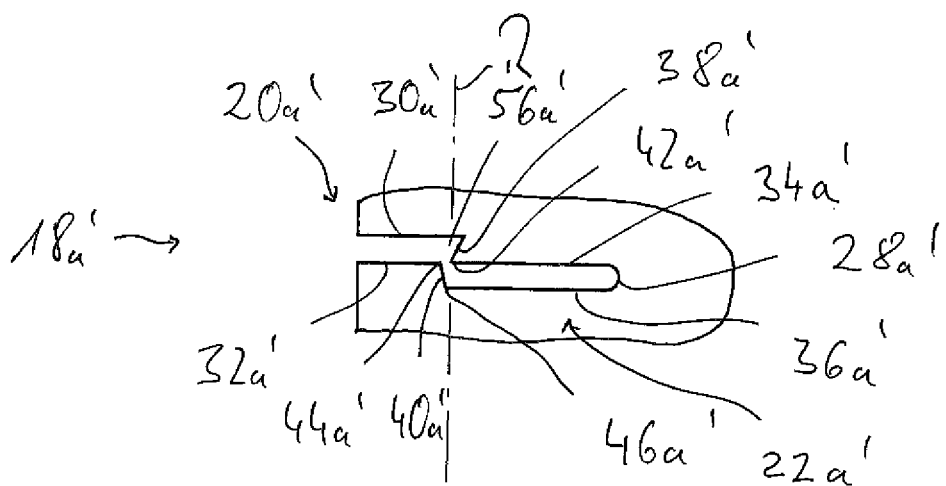
FIG. 4 is a section of a connection area with an alternative configuration of a slot.

An alternative type of configuration of the slots 18*a*, 18*b* described in detail above with reference to FIG. 3 is shown in FIG. 4 on the basis of the slot 18*a*' shown there. It is obvious that the other slot, not shown in FIG. 4, may also be configured correspondingly in case of an essentially mirror-symmetric configuration.

It can be seen in FIG. 4 that the two transition edges 38*a*' and 40*a*' are bent at an angle in relation to one another in opposite directions in relation to the reference line R, so that an undercut 56*a*' is formed in the area in which the outer transition edge 38*a*' adjoins the outer slot edge 30*a*' of the first slot area 20*a*'. The end 42*a*' of the outer transition edge 38a', which end is located closer to the inner transition edge 40a', is located, in turn, axially between the two ends 44a', 46a' of the inner transition edge 40a' in the direction of the pipe longitudinal axis A, so that the edge formed in the area in which the outer transition edge 38a' adjoins the outer slot edge 34a' of the second slot area 22a' cuts into the transition edge 40a' during the above-described reduction of the width of the slot 18a'.

It should finally be noted that the principles of the present invention can also be embodied in an embodiment of the two slots having a different configuration. Thus, the offset in opposite directions of the respective second slot areas in relation to the first slot areas may also be embodied by an offset of the second slot areas away from one another or also away from the symmetry axis, so that the two second slot areas have a greater circumferential distance or angular distance from one another than the two first slot areas. Further, the bend of the transition edges may also be selected, especially in the configuration of the slots or of the respective offset present, which configuration is shown in FIG. 3, to be such that the respective outer transition edge is bent at an angle to a greater extent in relation to the reference line than the inner transition edge, so that the end of the inner transition edge, which end is located closer to the outer transition edge, cuts into the outer transition edge during the reduction of the circumferential width of a respective slot. The undercut formed by a bend of the transition edge may also be provided in the area of the inner transition edge in the example shown in FIG. 4.

While the extension of the different slot areas essentially in parallel to the pipe longitudinal axis, which extension is described above and is shown in the figures, is especially advantageous, the slot areas or at least some of the slot areas may also extend at an angle in relation to the pipe longitudinal axis or to a line parallel thereto, for example, in such a sense that the slots or the slot areas approach each other or extend away from one another starting from the pipe end.

Further, it should be noted that the essentially mirror-symmetric configuration that can seen in FIG. 3 is especially advantageous concerning a uniform sealing effect in all circumferential areas. However, while preserving the principles of the present invention, the two slots may, in principle, also have mutually different configurations, especially different dimensions or mutually different extents of the respective offset present in the transition area between the respective first and second slot areas.

While specific embodiments of the invention have been shown and described in detail to illustrate the application of the principles of the invention, it will be understood that the invention may be embodied otherwise without departing from such principles.

What is claimed is:

1. An exhaust gas-guiding pipe for an exhaust system of an internal combustion engine, the pipe comprising a connection area provided at at least one axial pipe end for connecting the pipe, extending in the direction of a pipe longitudinal axis, to another pipe to be pushed into the connection area, the connection area comprising:

a first slot comprising a first slot first area located closer to the pipe end and a first slot second area, which is located axially farther away from the pipe end and is offset in a circumferential direction in relation to the first slot first area; and a second slot comprising a second slot first area located closer to the pipe end and a second slot second area, which is located axially farther away from the pipe end and is offset in a circumferential direction in relation to the second slot first area, the first slot first area being limited in the circumferential direction by a first slot first area inner slot edge facing the second slot first area and by a first slot first area outer slot edge facing away from the second slot first area, and the first slot second area being limited in the circumferential direction by a first slot second area inner slot edge facing the second slot second area and by a first slot second area outer slot edge facing away from the second slot second area, the first slot first area inner slot edge and the first slot second area inner slot edge being connected to one another by a first slot inner transition edge and the first slot first area outer slot edge and the first slot second area outer slot edge being connected to one another by a first slot outer transition edge, the second slot first area being limited in the circumferential direction by a second slot first area inner slot edge facing the first slot first area and by a second slot first area outer slot edge facing away from the first slot first area, and the second slot second area being limited in the circumferential direction by a second slot second area inner slot edge facing the first slot second area and by a second slot second area outer slot edge facing away from the first slot second area, the second slot first area inner slot edge and the second slot second area inner slot edge being connected to one another by a second slot inner transition edge and the second slot first area outer slot edge and the second slot second area outer slot edge being connected to one another by a second slot outer transition edge, wherein at least one of:

the first slot inner transition edge is inclined at an angle in relation to a reference line extending in the circumferential direction and the first slot outer transition edge is inclined at an angle in relation to the reference line extending in the circumferential direction, the first slot inner transition edge and the first slot outer transition edge being inclined at an angle in relation to one another in a same direction in relation to the reference line, one of the first slot inner transition edge and the first slot outer transition edge being inclined at an angle to a greater extent in relation to the reference line than the other, an end of the transition edge, which is inclined at an angle to a lesser extent, which end is located closer to the transition edge inclined at an angle to a greater extent, being located axially between two ends of the transition edge inclined at an angle to a greater extent; and the second slot inner transition edge is inclined at an angle in relation to the reference line extending in the circumferential direction and the second slot outer transition edge is inclined at an angle in relation to the reference line extending in the circumferential direction, the second slot inner transition edge and the second slot outer transition edge being inclined at an angle in relation to one another in a same direction in relation to the reference line, one of the second slot inner transition edge and the second slot outer transition edge being inclined at an angle to a greater extent in relation to the reference line than the other, an end of the transition edge, which is inclined at an angle to a lesser extent, which end is located closer to the transition edge inclined at an angle to a greater extent, being located axially between two ends of the transition edge inclined at an angle to a greater extent.

2. A pipe in accordance with claim 1, wherein an angular distance between the first slot first slot area inner slot edge and the second slot first area inner slot edge is smaller than 180°.

3. A pipe in accordance with claim 2, wherein the angular distance between the first slot first area inner slot edge and the second slot first slot area inner slot edge is in the range of 110° to 130°.

4. A pipe in accordance with claim 2, wherein:
the first slot first area outer slot edge and the first slot second slot area outer slot edge extend essentially in the direction of the pipe longitudinal axis; or
the second slot first area outer slot edge and the second slot second slot area outer slot edge extend essentially in the direction of the pipe longitudinal axis; or
the first slot first area outer slot edge and the first slot second slot area outer slot edge and the second slot first area outer slot edge and the second slot second slot area outer slot edge extend essentially in the direction of the pipe longitudinal axis; and
each outer slot edge and each inner slot edge extend essentially parallel to one another.

5. A pipe in accordance with claim 2, wherein:
the first slot first area outer slot edge and inner slot edge are spaced apart by a circumferential distance in a range of 3 mm to 5 mm; or
the first slot second area outer slot edge and inner slot edge are spaced apart by a circumferential distance in a range of 3 mm to 5 mm; or
the first slot first area outer slot edge and inner slot edge are spaced apart by a circumferential distance in a range of 3 mm to 5 mm and the first slot second area outer slot edge and inner slot edge are spaced apart by a circumferential distance in a range of 3 mm to 5 mm.

6. A pipe in accordance with claim 2, wherein:
the second slot first area outer slot edge and inner slot edge are spaced apart by a circumferential distance in a range of 3 mm to 5 mm; or
the second slot second area outer slot edge and inner slot edge are spaced apart by a circumferential distance in a range of 3 mm to 5 mm; or
the second slot first area outer slot edge and inner slot edge are spaced apart by a circumferential distance in a range of 3 mm to 5 mm and the second slot second area outer slot edge and inner slot edge are spaced apart by a circumferential distance in a range of 3 mm to 5 mm.

7. A pipe in accordance with claim 1, wherein:
the first slot first area and the second slot first area have essentially a same length of extension in the direction of the pipe longitudinal axis; or
the first slot second area and the second slot second area have essentially a same length of extension in the direction of the pipe longitudinal axis; or
the first slot first area and the second slot first area have essentially a same length of extension in the direction of the pipe longitudinal axis and the first slot second area and the second slot second area have essentially a same length of extension in the direction of the pipe longitudinal axis.

8. A pipe in accordance with claim 1, wherein the first slot and the second slot have an essentially mirror-symmetric configuration in relation to a symmetry axis that is essentially parallel to the pipe longitudinal axis.

9. A pipe in accordance with claim 1, wherein the outer transition edges of the two slots are inclined at an angle in relation to one another in opposite directions and to an equal extent in relation to the reference line.

10. A pipe in accordance with claim 1, wherein the first slot second area and the second slot second area are offset in the circumferential direction towards one another or away from one another in relation to the first slot first area and the second slot first area.

11. A pipe assembly, comprising:
a first pipe comprising a connection area provided at at least one axial pipe end for connecting the pipe, extending in the direction of a pipe longitudinal axis, to another pipe to be pushed into the connection area, the connection area comprising a first slot comprising a first slot first area located closer to the pipe end and a first slot second area, which is located axially farther away from the pipe end and is offset in a circumferential direction in relation to the first slot first area; and a second slot comprising a second slot first area located closer to the pipe end and a second slot second area, which is located axially farther away from the pipe end and is offset in a circumferential direction in relation to the second slot first area, the first slot first area being limited in the circumferential direction by a first slot first area inner slot edge facing the second slot first area and by a first slot first area outer slot edge facing away from the second slot first area, and the first slot second area being limited in the circumferential direction by a first slot second area inner slot edge facing the second slot second area and by a first slot second area outer slot edge facing away from the second slot second area, the first slot first area inner slot edge and the first slot second area inner slot edge being connected to one another by a first slot inner transition edge and the first slot first area outer slot edge and the first slot second area outer slot edge being connected to one another by a first slot outer transition edge, the second slot first area being limited in the circumferential direction by a second slot first area inner slot edge facing the first slot first area and by a second slot first area outer slot edge facing away from the first slot first area, and the second slot second area being limited in the circumferential direction by a second slot second area inner slot edge facing the first slot second area and by a second slot second area outer slot edge facing away from the first slot second area, the second slot first area inner slot edge and the second slot second area inner slot edge being connected to one another by a second slot inner transition edge and the second slot first area outer slot edge and the second slot second area outer slot edge being connected to one another by a second slot outer transition edge, wherein at least one of:
the first slot inner transition edge is inclined at an angle in relation to a reference line extending in the circumferential direction and the first slot outer transition edge is inclined at an angle in relation to the reference line extending in the circumferential direction, the first slot inner transition edge and the first slot outer transition edge being inclined at an angle in relation to one another in a same direction in relation to the reference line, one of the first slot inner transition edge and the first slot outer transition edge being inclined at an angle to a greater extent in relation to the reference line than the other, an end of the transition edge, which is inclined at an angle to a lesser extent, which end is located closer to the transition edge inclined at an angle to a greater extent, being located axially between two ends of the transition edge inclined at an angle to a greater extent; and the second slot inner transition edge is inclined at an angle in relation to the reference line extending in the circumferential direction and the second slot outer transition edge is inclined at an angle in relation to the reference line extending in the circumferential direction, the second slot inner transition edge and the second slot outer transition edge being inclined at an angle in relation to one another in a same direction in relation to the reference line, one of the second slot inner transition edge and the second slot outer transition edge being inclined at an angle to a greater extent in relation to the reference line than the other, an end of the transition edge, which is inclined at an angle to a lesser extent, which end is located closer to the transition edge inclined at an angle to a greater extent, being located axially between two ends of the transition edge inclined at an angle to a greater extent;

a second pipe pushed into the connection area of the first pipe; and a pipe clamp surrounding the first pipe in the connection area and pressing the first pipe radially against the second pipe.

12. A pipe assembly in accordance with claim 11, wherein the pipe clamp covers the slots provided in the connection area, in the direction of the pipe longitudinal axis, such that a slot bottom of the slots, which slot bottom is located at a distance from the pipe end, is covered by the pipe clamp.

13. A pipe assembly in accordance with claim 11, wherein an angular distance between the first slot first slot area inner slot edge and the second slot first area inner slot edge is smaller than 180°.

14. A pipe assembly in accordance with claim 13, wherein:

the second slot first area outer slot edge and inner slot edge are spaced apart by a circumferential distance in a range of 3 mm to 5 mm and the second slot second area outer slot edge and inner slot edge are spaced apart by a circumferential distance in a range of 3 mm to 5; and the first slot and the second slot have an essentially mirror-symmetric configuration in relation to a symmetry axis that is essentially parallel to the pipe longitudinal axis.

15. A pipe assembly in accordance with claim 11, wherein:

each of the slots has a slot bottom located at a distance from the pipe end; and each slot area, in a region between the respective slot bottom and the transition edges of the respective slot is fully covered by the pipe clamp.

16. A pipe assembly in accordance with claim 11, wherein the pipe clamp comprises a clamp lock area arranged in the connection area in a circumferential region comprising a smaller angular extension between the first slot and the second slot and essentially centrally between the first slot and the second slot in the circumferential direction.

17. An exhaust gas-guiding pipe for an exhaust system of an internal combustion engine, the pipe comprising a connection area provided at at least one axial pipe end for connecting the pipe, extending in the direction of a pipe longitudinal axis, to another pipe to be pushed into the connection area, the connection area comprising:

a first slot comprising a first slot first area located closer to the pipe end and a first slot second area, which is located axially farther away from the pipe end and is offset in a circumferential direction in relation to the first slot first area; and a second slot comprising a second slot first area located closer to the pipe end and a second slot second area, which is located axially farther away from the pipe end and is offset in a circumferential direction in relation to the second slot first area, the first slot first area being limited in the circumferential direction by a first slot first area inner slot edge facing the second slot first area and by a first slot first area outer slot edge facing away from the second slot first area, and the first slot second area being limited in the circumferential direction by a first slot second area inner slot edge facing the second slot second area and by a first slot second area outer slot edge facing away from the second slot second area, the first slot first area inner slot edge and the first slot second area inner slot edge being connected to one another by a first slot inner transition edge and the first slot first area outer slot edge and the first slot second area outer slot edge being connected to one another by a first slot outer transition edge, the second slot first area being limited in the circumferential direction by a second slot first area inner slot edge facing the first slot first area and by a second slot first area outer slot edge facing away from the first slot first area, and the second slot second area being limited in the circumferential direction by a second slot second area inner slot edge facing the first slot second area and by a second slot second area outer slot edge facing away from the first slot second area, the second slot first area inner slot edge and the second slot second area inner slot edge being connected to one another by a second slot inner transition edge and the second slot first area outer slot edge and the second slot second area outer slot edge being connected to one another by a second slot outer transition edge, wherein at least one of:

the first slot inner transition edge is inclined at an angle in relation to a reference line extending in the circumferential direction and the first slot outer transition edge is inclined at an angle in relation to the reference line extending in the circumferential direction, the first slot inner transition edge and the first slot outer transition edge being inclined at an angle in opposite directions in relation to one another relative to the reference line such that one of the first slot inner transition edge and the first slot outer transition edge forms an undercut with the slot edge of the first slot area, which said slot edge adjoins said one of the first slot inner transition edge and the first slot outer transition edge, wherein an end of one of the first slot inner transition edge and the first slot outer transition edge is located closer to an opposite other one of the first slot inner transition edge and the first slot outer transition edge and the end of the one of the first slot inner transition edge and the first slot outer transition edge is located axially between the two ends of the opposite other one of the first slot inner transition edge and the first slot outer transition edge; and the second slot inner transition edge is inclined at an angle in relation to the reference line extending in the circumferential direction and the second slot outer transition edge is inclined at an angle in relation to the reference line extending in the circumferential direction, the second slot inner transition edge and the second slot outer transition edge being inclined at an angle in opposite directions in relation to one another relative to the reference line such that one of the second slot inner transition edge and the second slot outer transition edge forms an undercut with the slot edge of the second slot area, which said slot edge adjoins said one of the second slot inner transition edge and the second slot outer transition edge, wherein an end of one of the second slot inner transition edge and the second slot outer transition edge is located closer to an opposite other one of the second slot inner transition edge and the second slot outer transition edge and the end of the one of the second slot inner transition edge and the second slot outer transition edge is located axially between the two ends of the opposite other one of the second slot inner transition edge and the second slot outer transition edge.

\* \* \* \* \*